US007492743B2

(12) United States Patent
Uhlik

(10) Patent No.: US 7,492,743 B2
(45) Date of Patent: *Feb. 17, 2009

(54) ASSIGNING TRAINING SEQUENCES BASED ON SPATIAL CHANNELS IN A WIRELESS COMMUNICATIONS SYSTEM

(75) Inventor: Christopher R. Uhlik, Danville, CA (US)

(73) Assignee: Intel Corporation, Santa Clara, CA (US)

(*) Notice: Subject to any disclaimer, the term of this patent is extended or adjusted under 35 U.S.C. 154(b) by 1012 days.

This patent is subject to a terminal disclaimer.

(21) Appl. No.: 10/262,409

(22) Filed: Sep. 30, 2002

(65) Prior Publication Data

US 2004/0062211 A1 Apr. 1, 2004

(51) Int. Cl.
H04B 7/212 (2006.01)

(52) U.S. Cl. .................. 370/337; 370/335; 370/344; 370/338; 375/130

(58) Field of Classification Search ............ 370/337, 370/338, 321, 442, 335, 344; 455/450; 375/130
See application file for complete search history.

(56) References Cited

U.S. PATENT DOCUMENTS

| 5,459,873 | A | 10/1995 | Moore et al. |
| 5,615,409 | A | 3/1997 | Forssen et al. |
| 5,722,078 | A | 2/1998 | Przelomiec et al. |
| 5,940,763 | A | 8/1999 | Alperovich et al. |
| 5,956,329 | A | 9/1999 | Pernice et al. |
| 6,111,867 | A | 8/2000 | Mann et al. |
| 6,154,661 | A * | 11/2000 | Goldburg ............ 455/562.1 |
| 6,359,865 | B1 | 3/2002 | Toskala et al. |
| 6,483,866 | B1 * | 11/2002 | Suzuki ............... 375/149 |
| 6,498,790 | B1 | 12/2002 | Shaheen et al. |
| 6,611,509 | B1 | 8/2003 | Hayashi et al. |
| 6,707,808 | B1 * | 3/2004 | Vedrine .............. 370/337 |
| 6,842,444 | B2 | 1/2005 | Bolgiano et al. |
| 6,865,175 | B1 * | 3/2005 | Ritter ............... 370/345 |
| 6,870,858 | B1 * | 3/2005 | Sebire .............. 370/514 |
| 6,977,912 | B1 * | 12/2005 | Porter et al. ........ 370/329 |
| 6,982,968 | B1 | 1/2006 | Barratt et al. |

(Continued)

FOREIGN PATENT DOCUMENTS

WO    WO 02/28121 A2    4/2002

OTHER PUBLICATIONS

M. Mouly, M.-B. Pautet: "The GSM System for Mobile Communications", 1992, M. Mouly and M.-B. Pautet, Palaiseau, France XP002269462.

(Continued)

Primary Examiner—Duc C Ho
(74) Attorney, Agent, or Firm—Blakely, Sokoloff, Taylor & Zafman LLP

(57) ABSTRACT

Embodiments of the present invention can be used to efficiently transmit access control and traffic information on separate spatial channels. In one embodiment, the invention includes assigning a conventional channel and a first training sequence to a first remote radio and a second training sequence to a second remote radio. Thereafter, the invention can include communicating with the first remote radio on a first spatial channel occupying the conventional channel using the first training sequence, and communicating with the second remote radio on a second spatial channel occupying the same conventional channel using the second training sequence.

36 Claims, 11 Drawing Sheets

U.S. PATENT DOCUMENTS

| 6,996,373 | B2 | 2/2006 | Kurhila et al. |
| 7,068,631 | B2 * | 6/2006 | Eriksson et al. ............. 370/337 |
| 7,133,380 | B1 | 11/2006 | Winters et al. |
| 7,133,421 | B1 * | 11/2006 | Puhakainen et al. ......... 370/498 |
| 2002/0115409 | A1 | 8/2002 | Khayrallah |
| 2003/0128658 | A1 | 7/2003 | Walton et al. |
| 2003/0156594 | A1 * | 8/2003 | Trott et al. .................. 370/442 |

OTHER PUBLICATIONS

"An Overview of the Application of Code Division Multiple Access to Digital Cellular Systems and Personal Communications Networks" Submission to the Cellular Telecommunications Industry Association (CTIA) CDMA Technology Investigation Subcommittee, XX, XX, Jan. 11, 1991, pp. 1-64, XP001150463.

Rizaner A et al., "Channel Extimation Using Short Training Sequences", IEEE vol. 6, Sep. 24, 2000, pp. 2630-2633, XP010525066.

Stirling I G et al., "Adaptive Multiuser MMSE Down-Link Receiver Techniques for UTRA TDD" IEEE vol. 2, Oct. 2, 2000, pp. 1436-1440, XP010535237.

3GPP: "UMTS Physical Channels and Mapping of Transport Channels Onto Physical Channels (FDD)", 3GPP TS 25.211 Version 4.4.0 Release 4, Mar. 2002, pp. 1-14, XP002268411.

Heath R W et al., "Coordinated Training and Transmission for Improved Interference Cancellation in a Cellular Network", IEEE vol. 2, Oct. 29, 2000, pp. 939-945, XP010535142.

U.S. Appl. No. 10/262,431, filed Sep. 30, 2002, Uhlik.

U.S. Appl. No. 10/262,088, filed Sep. 30, 2002, Uhlik.

International Search Report from PCT/US03/30204 mailed Mar. 9, 2004, 4 pgs.

International Search Report from PCT/US03/31910 mailed May 12, 2004, 6 pgs.

Office Action from U.S. Appl. No. 10/262,431 mailed Aug 15, 2007, 13 pgs.

Zorzi, Michele, "Performance of a MAC protocol with smart antennas in a multicellular environment," IEEE, (2000), pp. 402-407, XP-001042979.

Office Action from U.S. Appl. No. 10/262,088 mailed Dec. 14, 2006, 17 pgs.

Office Action from U.S. Appl. No. 10/262,088 mailed May 17, 2007, 19 pgs.

Office Action from U.S. Appl. No. 10/262,088 mailed Sep. 13, 2007, 20 pgs.

Office Action from U.S. Appl. No. 10/262,431 mailed Aug. 15, 2007, 13 pgs.

Office Action from U.S. Appl. No. 10/262,431 mailed Feb. 4, 2008, 6 pgs.

International Search Report from PCT/US03/30202 mailed Mar. 4, 2004, 6 pgs.

* cited by examiner

US 7,492,743 B2

ASSIGNING TRAINING SEQUENCES BASED ON SPATIAL CHANNELS IN A WIRELESS COMMUNICATIONS SYSTEM

BACKGROUND OF THE INVENTION

1. Field of the Invention

The present invention applies to the field of radio communications systems and, in particular, to logical traffic and access channels using training sequences.

2. Description of the Prior Art

Some radio communications systems, such as cellular voice and data communications systems, have several base stations in different locations available for use by mobile or fixed user terminals, such as cellular telephones or wireless web devices. Each base station communicates with a user terminal using a communications channel. For example, a communications channel may consist of a time slot in a TDMA (Time Division Multiple Access) frame on a physical carrier frequency. A TDMA frame may contain, for example, three uplink (user terminal to base station) time slots followed by three downlink (base station to user terminal) time slots, or vice-versa. The time slots may be used to transmit communication bursts, or they may be delineated on a continuous signal.

A physical carrier frequency may be a 625 kHz band around a central frequency, such as 800 MHz or 1.9 GHz. Thus, a base station transmits to a given user terminal, for example, on the second transmit and receive time slots on this carrier frequency in a given frame. Furthermore, the communications channel, also known as the conventional channel or conventional communications channel, may be organized using common duplexing techniques, such as FDD (Frequency Division Duplex) and TDD (Time Division Duplex), and common multiple access techniques such as FDMA (Frequency Division Multiple Access), TDMA (Time Division Multiple Access) and CDMA (Code Division Multiple Access). The channel may further be organized according to a hopping function indicating alternating resources over time.

Furthermore, in typical radio communications systems, the user terminals register with a base station prior to being able to access the resources of the base station, such as the channels of the base station or connections available through the base station. For example, before a wireless web user terminal is allowed to connect to an Internet service provider (ISP) using the channel resources of a base station, the user terminal must register with the base station. The registration may take place at the base station, or further upstream, for example, at a network box or ISP.

After the user terminal registers with the base station, it can request access to the base station and the resources associated with the base station. In a typical system the user terminal requests access on a designated access control channel, and the base station assigns another channel for future communications using this control channel. This designated access control channel uses a conventional communications channel described above. Since this channel is used only for access, it is not used for traffic data and is an overhead channel that decreases the efficiency of the communications system.

BRIEF SUMMARY OF THE INVENTION

Embodiments of the present invention can be used to efficiently transmit access control and traffic information on separate spatial channels. In one embodiment, the invention includes assigning a conventional channel and a first training sequence to a first remote radio and a second training sequence to a second remote radio. Thereafter, the invention can include communicating with the first remote radio on a first spatial channel occupying the conventional channel using the first training sequence, and communicating with the second remote radio on a second spatial channel occupying the same conventional channel using the second training sequence.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Overview

According to one embodiment of the invention, a random access channel (RACH) shares a conventional channel with one or more traffic channels (TCH). In one embodiment, the base station scans a received signal for a random access (RA) burst and uses spatial processing to extract the RA burst from the received signal that includes one or more traffic bursts. In one embodiment, a user terminal includes a training sequence in the RA burst that indicates that it is an RA burst when using the RACH. In one embodiment, the RACH and one or more TCHs are SDMA spatial channels occupying one conventional channel. The RA burst and the traffic bursts each have a training sequence in the same portion of the burst indicating which spatial channel they are using.

Using a Communications Channel for Access and Traffic

Figure 1:
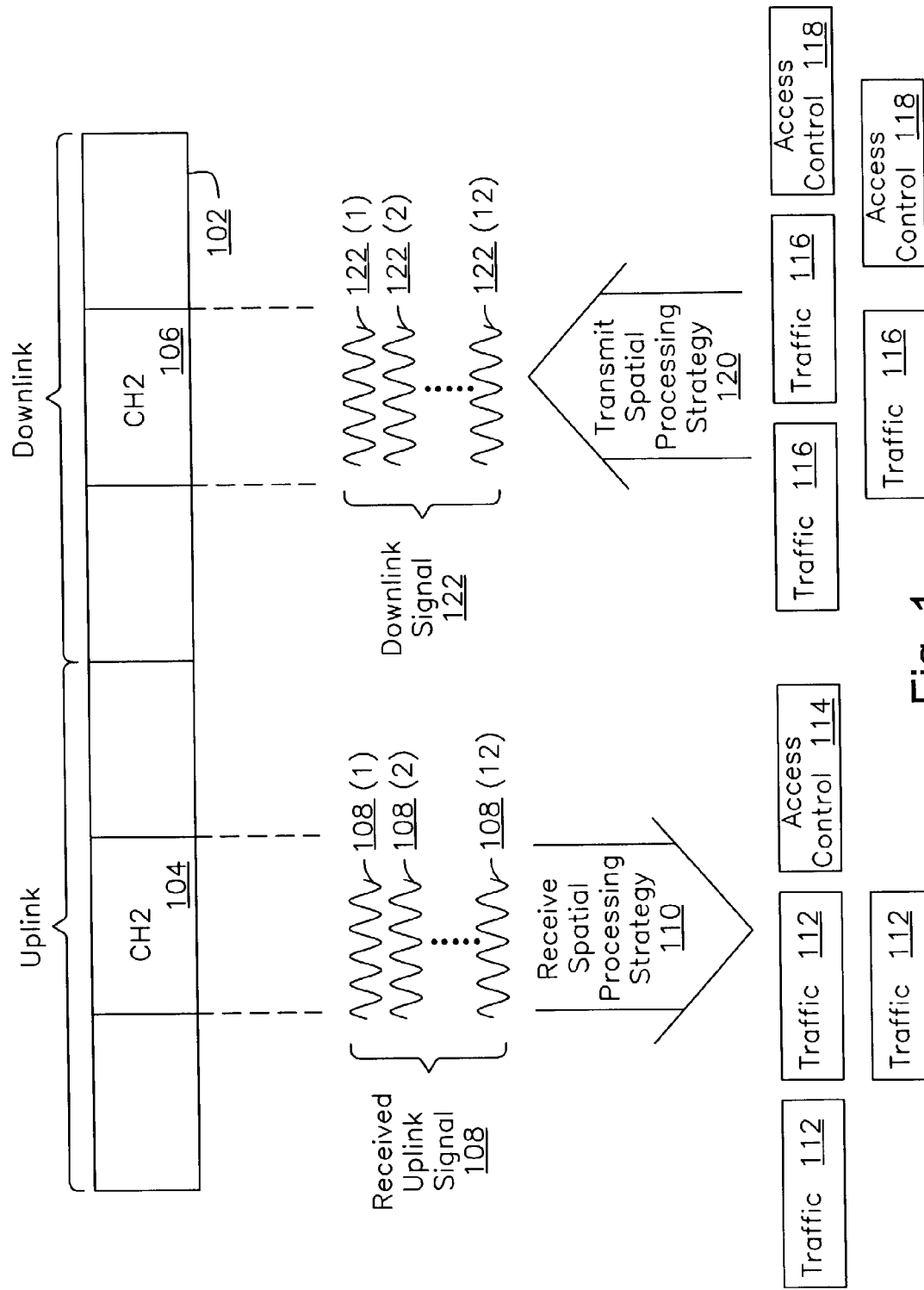
FIG. 1 is a conceptual diagram of one embodiment of the present invention.

One embodiment of the present invention is described with reference to FIG. 1. FIG. 1 provides a conceptual demonstration of how embodiments of the invention may be practiced in a TDMA system. FIG. 1 shows a TDMA frame 102 having three uplink timeslots and three downlink timeslots. A base station receives during the uplink timeslots and transmits during the downlink timeslots using an RF carrier. The second uplink timeslot 104 and the second downlink timeslot 106 are a timeslot pair representing a conventional communications channel, labeled Channel 2.

The base station receives an uplink signal 108 in uplink timeslot 104 using an antenna array or two or more antennas. The antenna array used in the system described in FIG. 1 has twelve antenna elements, each receiving a signal 108(1)-108(12). The signals 108(1)-108(12) are then processed using a receive spatial processing strategy 110 to extract the components of the received signal 108. In FIG. 1, these components include three uplink traffic messages 112 from three different user terminals and an uplink access control message 114, such as a random access message from a fourth user terminal.

On the downlink, the base station combines three downlink traffic messages 116 for three different user terminals with up to two downlink access control messages 118, such as an access assignment message to the fourth user terminal, and a page to a fifth user terminal. The base station uses a transmit spatial processing strategy 120 to generate the downlink signals 122(1)-122(12) to be transmitted from each antenna element of the array. The resulting downlink signal 122 is then transmitted by the base station in downlink timeslot 106.

Receive Traffic and Access Control Processing

Figure 2:
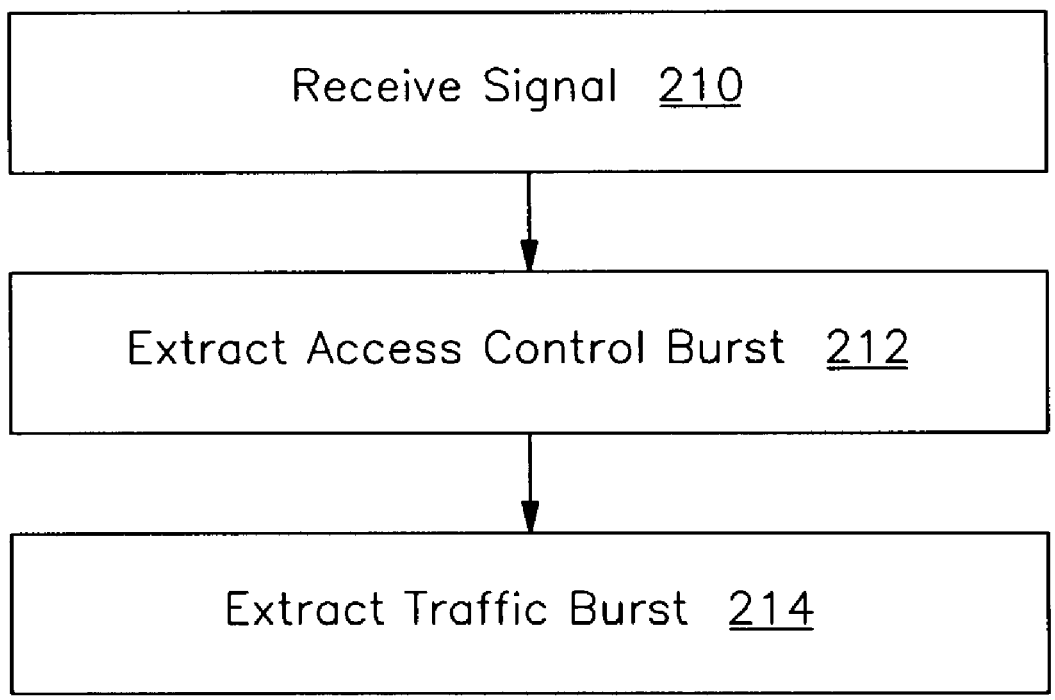
FIG. 2 is flow chart of receive processing according to one embodiment of the present invention.

FIG. 2 is a flow chart of receive processing according to one embodiment of the present invention. First, the base station receives 210 a signal, such as signal 108 in FIG. 1. The received signal is a composite signal resulting from transmissions from multiple user terminals in the same timeslot on the same carrier. One of these user terminals transmitted an access control burst, another user terminal transmitted a traffic burst. Other user terminals could have transmitted additional bursts.

In one embodiment, the access control burst is related to accessing the base station by the user terminal. For example the access control burst can be a random access burst containing a random access message. A random access burst is sent by a user terminal when the user terminal wishes to initiate communication with the base station. In other words, the random access burst is a request for a logical connection to the base station. For example, a cellular telephone can send a random access message when the user of the cellular telephone wishes to make a phone call. The random access burst can also be a request for a data connection, such as a data stream.

Furthermore, the traffic burst is part of an existing logical connection, such as an existing data stream or an existing cellular telephone call. In one embodiment, the traffic bursts use dedicated resources, that is resources reserved for the existing logical connection, whereas the random access bursts use contention resources.

The signal can be received 210 using two or more antenna elements, such as an adaptive antenna array. Thus, the signal is received as several versions of the signal, one version for each antenna element used for reception. The received signal is then spatially processed to extract 212 the random access burst and to extract 214 the traffic burst from the signal, among other bursts transmitted by the various user terminals.

In one embodiment, spatial processing involves applying a switched antenna diversity strategy to the received signal. Switched antenna diversity involves selecting the best version of the signal from the versions received at each antenna element. The "best" version can be determined according to a signal quality measure, such as received signal strength indications (e.g., RSSI), bit error rate (BER), frame error rate (FER), signal to noise ratio (SNR), and signal to interference and noise ration (SINR). Different switched antenna diversity strategies may use a subset of the antennas that collectively have the best received signal.

In another embodiment, spatial processing involves applying a delay and add processing strategy to the received signal. Delay and add processing takes advantage of multipath combining capabilities that may exist in the receive processor conventional receivers. For example, delay and add spatial processing can be used to form a signal—called a "sum signal"—that is a sum of a signal received at one antenna with one or more delayed versions of respective signals received at one or more respective additional antennas. The sum signal is then processed by a circuit in the receive processor of the receiver designed for multipath signal processing, e.g., an equalizer or other multipath processor to extract a received signal from the sum signal. Some embodiments also provide for changing the amount of delay each of the delay elements provide, and for such embodiments, different delay and add modes may also differ by the different amounts of predetermined delays.

In another embodiment of the present invention, spatial processing involves applying an adaptive switched beam spatial processing strategy to the received signal. Adaptive beam switching can be implemented by using switches for adaptively selecting which antennas to use to select a directional beam. One embodiment uses a Butler matrix for a beamforming network. Each of the receive paths associated with the antenna elements except for one are each switchable one and off by one or more control signals.

Different adaptive switched beam strategies may differ by how often the best beam is selected. Different adaptive switched beam modes may also differ by how many antennas are selected.

In yet another embodiment of the present invention, the spatial processing involves applying an adaptive smart antenna processing strategy to the received signal. In general, adaptive smart antenna processing includes, in the case of receive spatial processing, forming a processing strategy (called a beamforming strategy) to preferentially receive a signal from a selected remote terminal. In some embodiments, interference also is rejected from known co-channel interferers. Many adaptive smart antenna processing strategies are known, and only some are mentioned herein. Receive smart antenna processing may be linear or non-linear. One form of linear receive smart antenna processing includes adjusting the phase and amplitude of each of the received version of the signal from each antenna element by a phase and amplitude amount according to a receive processing strategy that is determined from time to time, and combining (adding) the weighted signals. Each antenna signal's phase shift and amplitude change may be described by a complex-valued weight so that determining the beamforming strategy includes determining a set of complex weights such that the sum of the weighted receive signals preferentially selects or enhances the signals received from a selected transmitter, and in some strategies preferentially rejecting or significantly reducing the contributions of signals from interfering transmitters.

In another embodiment of the present invention, the spatial processing involves applying maximum ratio combining spatial processing strategy to the received signal. In maximum ratio combining each signal branch is multiplied by a weight factor that is varied according to, e.g., proportional to the signal amplitude. That is, branches with strong signal are further amplified, while weak signals are attenuated.

In yet another embodiment of the present invention, the spatial processing involves using knowledge about the transmitted bursts to receive the composite signal.

In one embodiment, this knowledge may be the way in which data is modulated onto the bursts. For example, if it is known that the modulated transmitted data uses a modulation scheme that has a constant modulus, a transmitted burst can be reconstructed from a plurality of signals received by an antenna array by adjusting the weights in a variable receive weight set so that the reconstructed transmitted signal is closest to a constant modulus signal according to some criterion, e.g., minimum squared deviation from a constant modulus signal. Examples of communication systems that use a constant modulus modulation scheme include phase modulation (PM), frequency modulation (FM), phase shift keying (PSK) and frequency shift keying (FSK). If, for example, it is also known that the modulated transmitted data uses a modulation scheme such as π/4DQPSK wherein subsequent symbols can only vary in phase by pre-known amounts, one strategy determining method determines the set of weights such that the reconstructed signal most closely resembles a signal having that property according to some criterion.

In yet another embodiment of the present invention, the spatial processing involves applying an adaptive smart antenna spatial processing strategy to the received signal based on a known training signal. Some wireless communication systems specify signals for transmission that include a known part called a training signal or training sequence. The training data may be used at a receiver for various purposes, e.g., for channel estimation and equalization. For example, in a GSM system the middle portion of each burst contains a known 26 bit training sequence. Similarly in a CDMA system, a known pilot signal is contained in the received signal. The known training sequence can also be used to determine an adaptive smart antenna strategy. According to such a strategy, the part of the received signal that corresponds to the known training signal is used to determine the set of weights that generates a signal that most closely matches the known training signal. In particular, the set of weights is generated such that the correlation of the weighted sum of the part of the received signal with a locally generated version of the training signal is high.

In one embodiment the set of weights is calculated using the least-squares equation:

$$w = R_{zz}^{-1} R_{zs}; \tag{1}$$

where $R_{zz}^{-1}$ is the inverse of the matrix formed by:

$$\sum_{k=1}^{N-1} z(k) z(k)^H; \tag{2}$$

and $R_{zs}$ is determined by:

$$\sum_{k=0}^{N-1} z(k) s(k)' \tag{3}$$

where $s(k)'$ is the complex conjugate of $s(k)$, $s(k)$ represents the known training sequence, and $w$ is a complex valued weight vector corresponding to the set of weights. A similar approach is described in detail, for example, in U.S. Pat. No. 5,592,490 to Barratt.

After the access control burst is extracted 212 it is decoded and processed by the base station. For example, if the access control burst is a random access burst from a cellular phone requesting a channel for communication, the base station may respond with a channel assignment, a no-resources-available signal, or some other appropriate response. Similarly, the traffic burst is also processed. For example, if the traffic burst is part of a phone call, then the base station may forward the data in the traffic burst to the Public Switched Telephone Network (PSTN). Other bursts extracted from the received signal can be similarly processed.

Figure 3:
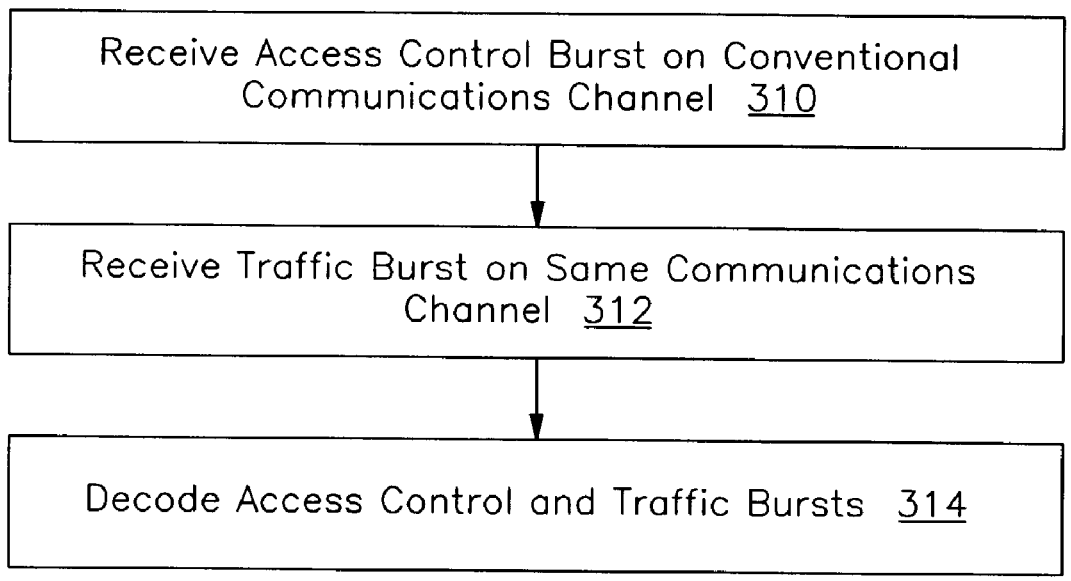
FIG. 3 is another flow chart of receive processing according to another embodiment of the present invention.

FIG. 3 is another flow chart of receive processing according to an embodiment of the present invention. The base station receives 310 the access control burst on a communications channel. A communications channel, also known as a conventional channel or conventional communications channel, can be any spectrum partition according to any traditional channelization scheme, such as TDMA, FDMA, CDMA, or a combination of the traditional schemes, such as FDMA/TDMA (a timeslot on a frequency band). Overlapping in time with the reception of the access control burst, for example in the same timeslot, the base station also receives 312 the traffic burst. Thus, the signal the base station actually receives is a composite signal including the access control burst and the traffic burst. Other signals, such as additional traffic bursts and interference can also be part of the composite signal received at the antenna array.

The base station next decodes 314 the access control and traffic bursts. Using spatial processing, as described above, the base station is able to separate the composite signal actually received into the access control burst and the traffic burst. Once the bursts are separated they can be decoded using conventional demodulation and decoding techniques.

Figure 4:
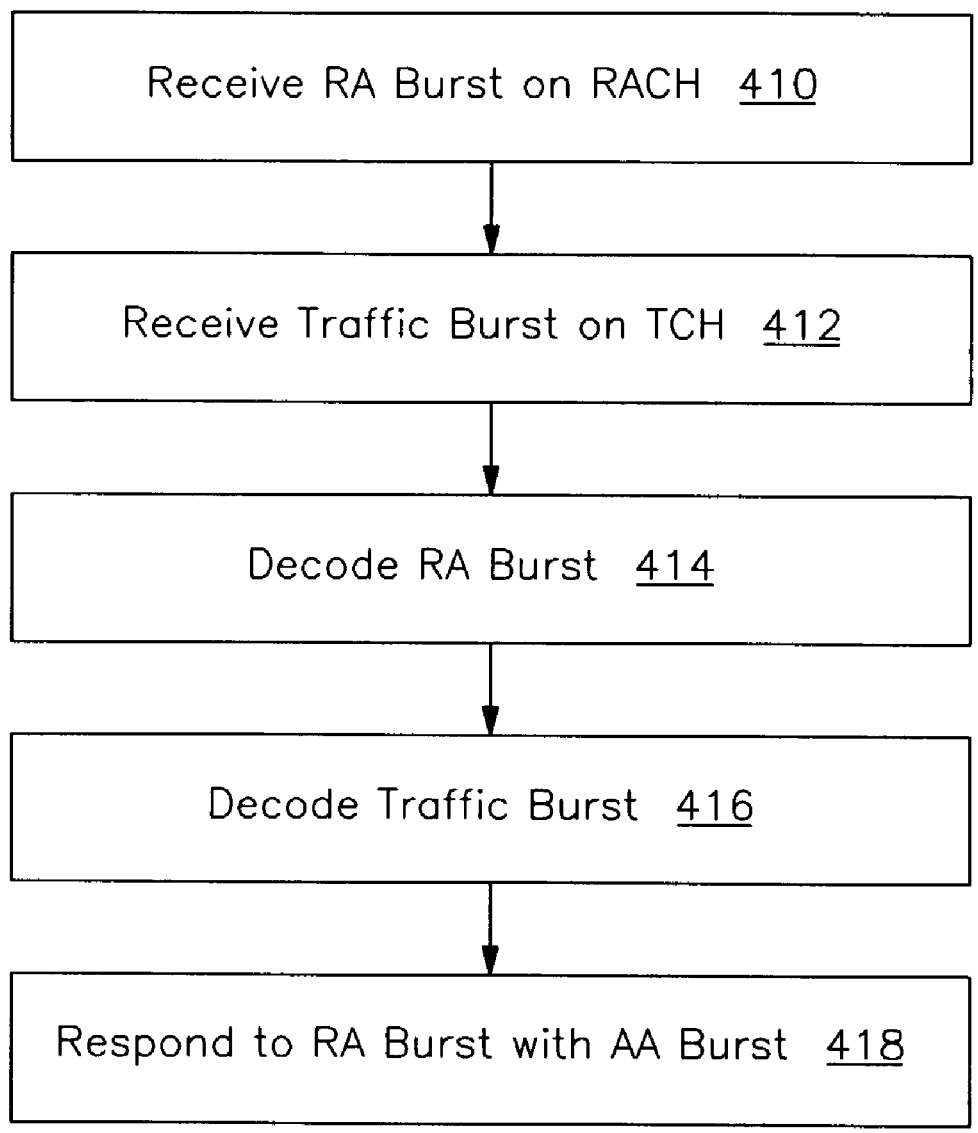
FIG. 4 is another flow chart of receive processing according to a detailed embodiment of the present invention.

In one embodiment, it is contemplated the invention is implemented in a TDD high bandwidth wireless data and voice system, such as ArrayComm's i-BURST™ system. However, it should be appreciated the invention is not limited to the i-BURST™ system or any other particular air interface, and in fact, it should become apparent from the description herein that the invention may find use with a variety of air interface protocols and communications systems. The embodiment described with reference to FIG. 4 is shown in the context of an i-BURST™ type system. An example i-BURST™ type system is a hybrid packet switched and circuit switched system, in which packets are transmitted in data streams. A stream can be initiated by a base station or a registered user terminal using a random access/access assignment exchange, during which reserved resources are allocated to the stream. Once the stream is open, data packets can flow until the stream is closed.

In an example i-BURST™ type system, registered user terminals can request a data stream using a random access (RA) burst, such as the RA burst illustrated by Table 1.

TABLE 1

| NAME | DURATION | LENGTH |
|---|---|---|
| Ramp-Up | 10 μs | |
| Training | 114 μs | 57 symbols |
| RA Message | 365 μs | 182 symbols |
| Ramp-down | 10 μs | 5 symbols |
| Guard | 15 μs | |

The training segment of 114 μs includes a known training sequence of 57 symbols. This sequence is completely known at the base station receivers. This sequence may be any sequence of symbols, but will generally have some desirable qualities.

The RA Message segment contains an RA message. Example RA messages are:

RA-rts: a message sent to request a TCH data stream that is initiated by the user terminal;

RA-page-response: a message sent to request a TCH data stream in response to a page from the base station;

RA-rts-directed: a message sent to request a new TCH data stream in response to a in-band message received by the user terminal in an existing TCH data stream;

RA-rts-short: a message sent to request a short TCH data stream;

RA-ping: a message sent to inform the base station that the user terminal is within communication range and whishes to stay registered; also to inquire whether the base station has data for the user terminal.

The RA Message also includes an identifier of the user terminal sending the RA burst. Typically, this identifier will be a registration identifier (RID) associated with the user terminal sending the RA burst, but it can be other identifiers, such as a paging identifier (PID). The RID is unique to the user terminal at the base station, and is assigned during registration. The RID lets the base station know who the requesting user terminal is, and if multiple registrations are open, on which registration the stream should be opened. The RA burst can further include other fields or segments, such as a Fast Associated Control Channel (FACCH) segment, that are omitted in order to simplify this descriptions.

The example RA burst is transmitted by the user terminal on a RACH logical channel. The RACH logical channel is a spatial channel. That is, the RACH logical channel is defined by an FDMA carrier, a TDMA timeslot, and a spatial channel number marked by a unique training sequence. During registration, a user terminal is assigned a set of RACH logical channels it may use to send RA bursts. Other user terminals can also use the RACH logical channel, making it a contention channel.

The base station receives 410 the RA burst described above on a RACH logical channel. The base station can scan all conventional channels on which random access is allowed for the training sequence indicating the RA spatial channel. The base station also receives 412 a traffic burst on a traffic TCH logical channel from another user terminal. The traffic burst also includes a training sequence and a payload carrying user traffic, such as data. The TCH logical channel is also a spatial channel, but it is a dedicated channel. The TCH is for receiving traffic bursts that are part of an existing ongoing data stream.

The RACH logical channel and the TCH logical channel are both spatial division multiple access (SDMA) spatial channels occupying the same conventional channel. Thus, the RA burst and the traffic burst are received on the same FDMA carrier in the same TDMA timeslot. The RA burst's training sequence indicates that it is on the RACH logical channel, while the traffic burst's training sequence indicates which TCH logical channel it is on. In one embodiment, three TCH logical channels and up to two RACH logical channels occupy a single conventional channel. In another embodiment, four TCH logical channels and one RACH logical channel can occupy one conventional channel.

Next, the base station decodes 414 the RA bursts. The base station uses the training sequence included in the RA burst as set forth above to determine the receive spatial processing signature and weight vector for the user terminal that sent the RA burst. By applying the weight vector to the received signal, the base station extracts and decodes the RA burst to get the RA Message. The base station decodes 416 the traffic burst and payload in a similar manner.

After the RA burst is decoded, the base station responds 418 to the RA Message by sending an access acknowledge (AA) burst on the RACH logical channel downlink. The AA burst is discussed in more detail further below.

Transmit Traffic and Access Control Processing

Figure 5:
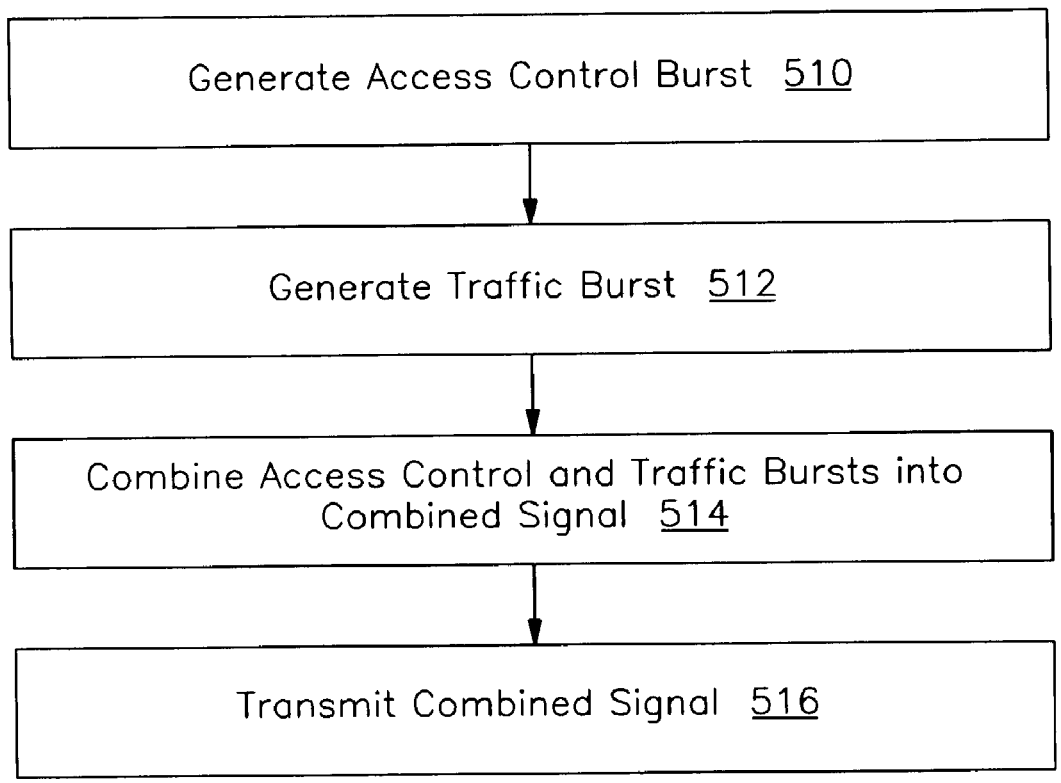
FIG. 5 is flow chart of transmit processing according to one embodiment of the present invention.

FIG. 5 is a flow chart of transmit processing according to one embodiment of the present invention. First, the base station generates 510 an access control burst to be sent to a user terminal, such access control burst 118 in FIG. 1. As described above, the access control burst can be related to accessing the base station by the user terminal. In one embodiment, the access control burst is an access assignment burst that is sent by a base station in response to a request for access. The access assignment may be a denial or grant of the request. For example, a base station can use an access assignment to grant a voice connection to a cellular phone and assign a voice channel for the connection. In another embodiment in which the random access burst was a request for a logical connection, such as a data stream, the base station can send an access assignment burst to open the stream and assign resources, such as a logical or spatial channel, to the stream.

The base station also generates 512 a traffic burst to be sent to a second user terminal, such as traffic burst 116 in FIG. 1. The traffic burst is part of an existing logical connection, such as an existing data stream or an existing cellular telephone call. In one embodiment, the traffic bursts use dedicated resources, that is resources reserved for the existing logical connection, whereas the random access bursts use contention resources.

The base station then combines 514 the traffic burst and the random access burst into a composite signal using spatial processing. Other burst can also be generated and combined with the two bursts. For example, in one embodiment, three traffic burst and two access control bursts are combined into a downlink composite burst. Various modes of spatial processing are set forth above. In one embodiment, the base station combines 514 the burst using transmit weights to implement a Spatial Division Multiple Access (SDMA) method. The transmit weights, like the receive weights, indicate phase and amplitude adjustments to each burst on an antenna-by-antenna basis. In some embodiments, the receive weights can be determined from the receive weights by compensating for differences between the receive and transmit chains.

The combined composite signal containing the traffic burst and the random access burst is then transmitted from the base station antenna array to each appropriate user terminal in a signal timeslot, such as timeslot 106 in FIG. 1. Other burst may also be included in the combined burst. In one embodiment, the base station can generate up to four traffic burst. The four traffic burst and the access control burst are then combined into a composite signal as described above.

In another embodiment, the base station can generate an additional access control burst, such as a page burst containing a page. As described above, a page can be used to prompt a user terminal to request access, to let the user terminal know that the base station wishes to initiate communication, or for other similar purposes. The page may be transmitted directionally or non-directionally. The page burst can then be combined with an access assignment burst and some number of traffic bursts into a composite signal, as described above.

The composite signal has been generated such that each user terminal receives the burst directed toward it. That is, the user terminal need not perform spatial processing to receive the appropriate burst from the transmitted combined signal. The user terminal can use spatial processing to further enhance their received signals.

Figure 6:
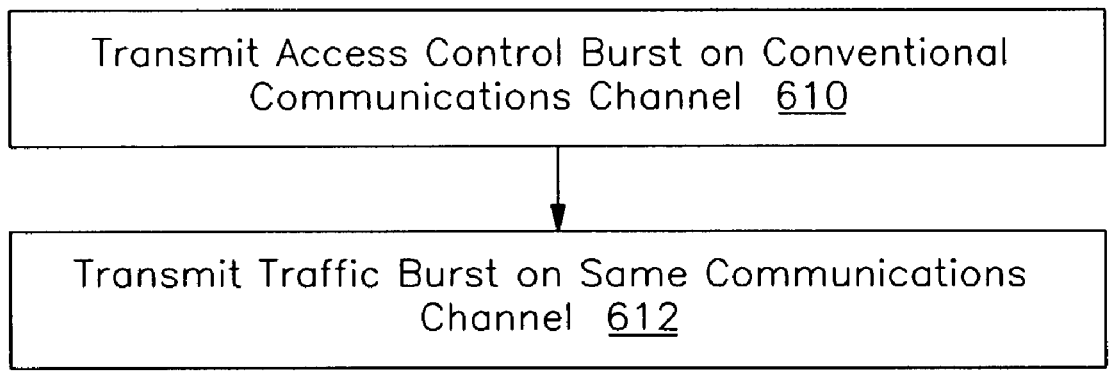
FIG. 6 is another flow chart of transmit processing according to another embodiment of the present invention.

FIG. 6 is another flow chart of transmit processing according to an embodiment of the present invention. The base station transmits 610 the access control burst on a communications channel. As discussed above, a communications channel can be any spectrum partition according to any traditional channelization scheme, such as TDMA, FDMA, CDMA, or a combination of the traditional schemes, such as FDMA/TDMA (a timeslot on a frequency band).

Overlapping in time with the transmission of the access control burst, for example in the same timeslot, the base station also transmits 612 the traffic burst. Thus, the signal the base station actually transmits is a composite signal including the access control burst and the traffic burst, among any other signals transmitted from the base station using the antenna array. In one embodiment, these other signals can include additional traffic bursts and an additional access control burst, such as a page burst.

Figure 7:
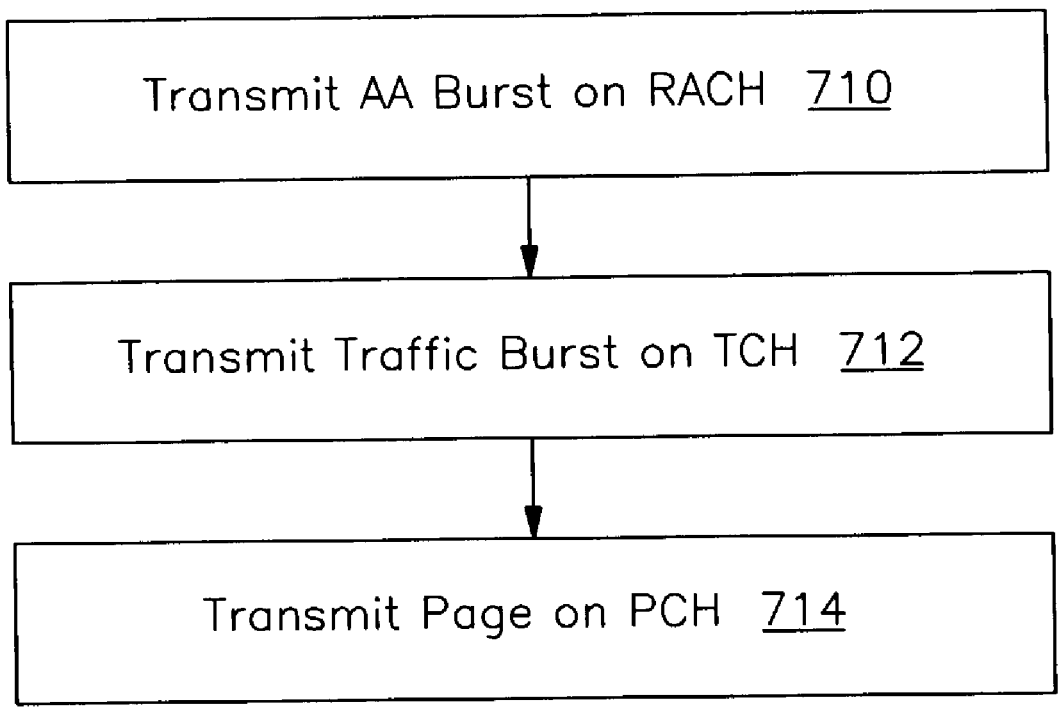
FIG. 7 is another flow chart of transmit processing according to a detailed embodiment of the present invention.

FIG. 7 is another flow chart of transmit processing according to an example embodiment of the present invention. The embodiment described with reference to FIG. 7 is shown in the context of the example i-BURST™ type system discussed above. In an example i-BURST™ type system, registered user terminals can request a data stream using a random access (RA) burst, such as the RA burst illustrated by Table 1 above. The base station responds to the RA burst with an access assignment (AA) burst, such as the AA burst illustrated by Table 2:

TABLE 2

| NAME | DURATION | LENGTH |
| --- | --- | --- |
| Ramp-Up | 10 μs | |
| Head Training | 68 μs | 34 symbols |
| AA Message | 920 μs | 460 symbols |
| Tail Training | 36 μs | 18 symbols |
| Ramp-down | 10 μs | |
| Guard | 15 μs | |

The head and tail training segments include known training sequences used for training by the user terminal. In one embodiment, the user terminal does not perform spatial processing, thus there sequences are not used to determine spatial processing weights. The AA Message segment contains an AA message. Example AA messages are:

The AA Message segment contains an AA message. Example AA messages are:

AA-cts: a message sent to grant the requested TCH data stream;

AA-reject: a message sent to deny the requested TCH data stream;

AA-ping-ack: a message sent to acknowledge receipt of an RA-ping and to let the user terminal know that the registration expiration timer has been reset;

AA-cts-short: a message sent to grant a requested short TCH data stream;

AA-queued: a message sent to inform the user terminal that the base station received a request for a TCH data stream and will page the user terminal when there are resources available for the stream.

The AA Message also includes the registration identifier (RID) associated with the user terminal to which the AA burst is addressed. When the AA Message grants a stream, such as a AA-cts, the AA message also includes resource assignment information, such as a conventional channel ID, a logical channel ID, a spatial channel number, or some other form of resource assignment. The AA message can contain other information, such as modulation and coding information, power adjustment commands, timing advance measurements, or other data and control messages.

The base station transmits 710 the AA burst described above on the RACH logical channel. The downlink portion of the RACH logical channel is also spatial channel. However, the base station does not contend for the use of the RACH logical channel. The base station also transmits 712 a traffic burst on a traffic TCH logical channel to another user terminal. The TCH logical channel is also a spatial channel occupying the same conventional channel as the RACH. Thus, the two bursts are transmitted in the same timeslot on the same carrier. The two bursts can be marked by different training sequences. The TCH is for transmitting traffic bursts that are part of an existing ongoing data stream.

As described above, the RACH logical channel and the TCH logical channel are both SDMA spatial channels occupying the same conventional channel. In one embodiment, three TCH logical channels and up to two RACH logical channels occupy a single conventional channel. In this embodiment, the second RACH logical channel can be used to transmit another access control burst, such as a page, to another user terminal. As explained above, a page is a prompt to a user terminal to initiate a stream by sending an RA-rts. The page contains the PID of the user terminal assigned during registration. Thus, in one embodiment, the base station also transmits 714 a page burst on a paging channel (PCH) which is an SDMA spatial channel occupying the same conventional channels as the RACH and the TCH.

Spatial Channels Indicated by Training Sequences

As described above, transmitting and receiving access control and traffic messages on the same conventional channel can be achieved by creating spatial channels using an SDMA strategy or technique. In one embodiment, each of these spatial channels is identified with a unique training sequence. In other words, a user terminal is assigned to a spatial channel by being assigned a conventional communications channel to communicate on, and a training sequence to use with these communications.

The spatial channels occupying one conventional channel each have a different training sequence with which they are associated. These training sequences can have some desirable qualities, such as a low cross-correlation, to aid in the spatial processing. For example, such training sequence can be used to generate more accurate receive weights, which in turn result in higher quality signals, i.e., signals with higher signal to noise ratios.

Figure 8:
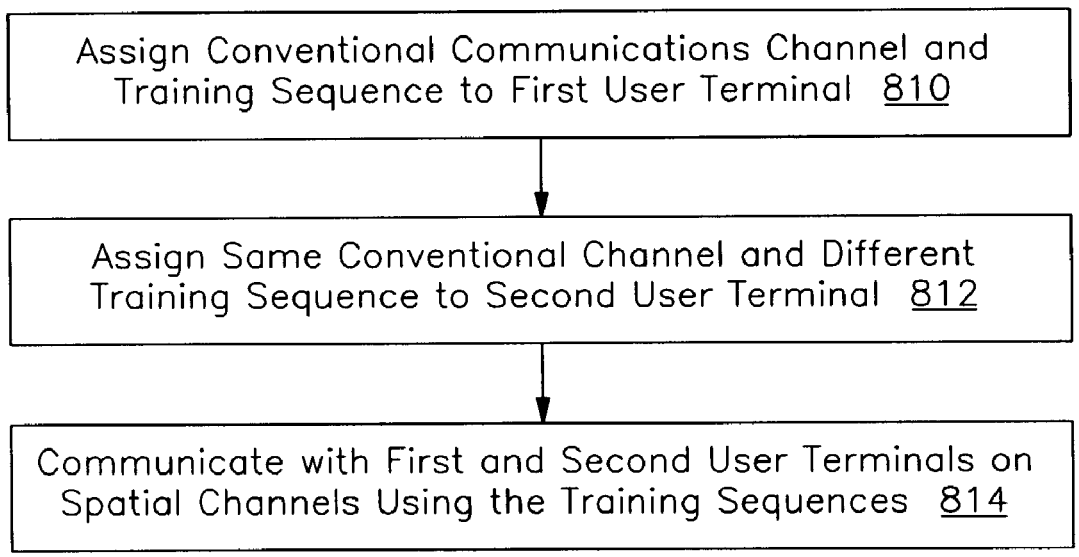
FIG. 8 is a flow chart of training sequence assignment according to an embodiment of the present invention.

FIG. 8 is a flow chart of spatial channel assignment according to one embodiment of the present invention. First, the base station assigns 810 a conventional channel and a training sequence to a first user terminal, UT1. In one embodiment, UT1 is registering at the base station, and the spatial channel assignment is part of the set of random access channels UT1 is allowed to use to transmit random access bursts. The spatial channel assignment can also be resource allocation for a logical connection such as a stream, or an additional resource for an existing stream.

The base station also assigns 812 the same conventional channel to a second user terminal, UT2. However, UT2 is assigned a different training sequence than UT1. In one embodiment, the two training sequences have low cross-correlations. The training sequence assignments need not be explicit. For example, the base station may assign UT2 to Channel 4/Spatial Channel 2. In one embodiment, UT2 can look up or determine the proper training sequence using an identifier of the base station, such as the base station color code (BSCC), and the assigned spatial channel number.

In one embodiment, the spatial channel assigned to UT2 is the resource for a logical connection, such as a stream. Such an assignment can be transmitted in an Access Assignment burst described above. After the training sequences have been assigned, the base station can communicate 814 with the user terminals on the respective assigned spatial channels. That is, in one embodiment, the base station can receive an access control burst from UT1 that includes UT1's assigned training sequence on the conventional channel, e.g. a RF carrier/timeslot pair, shared by the user terminals, and the base station can receive a traffic burst from UT2 that includes UT2's assigned training sequence on the same conventional channel. The base station uses the training sequences, as described further above, to separate and decode the two received bursts.

In one embodiment, UT1's spatial channel assignment is a random access channel (RACH). As described above, a RACH can be a contention channel. That is, other user terminals, such as UT3, can be assigned the same RACH to use to request logical connections. Thus, UT1 and UT3 are assigned both the same conventional channel and the same training sequence. This may be acceptable, since access requests are transmitted relatively infrequently compared to traffic bursts during a stream. In one embodiment, if UT1 and UT3 transmit access request bursts during the same timeslot, there is a collision and neither burst is received. A random backoff period can minimize the probability of another collision.

In one embodiment, the random access burst from UT1 and the traffic burst from UT2 have their respective training sequences in the same portion of the respective bursts. That is, the structure of the bursts is such that the training sequences are in identical position and or identical length in the bursts. Such a burst structure can accommodate the SDMA strategy, since the training sequence can be designed to have low cross-correlations. Furthermore, the base station will only need to scan this portion of the received composite signal for training sequences.

Figure 9:
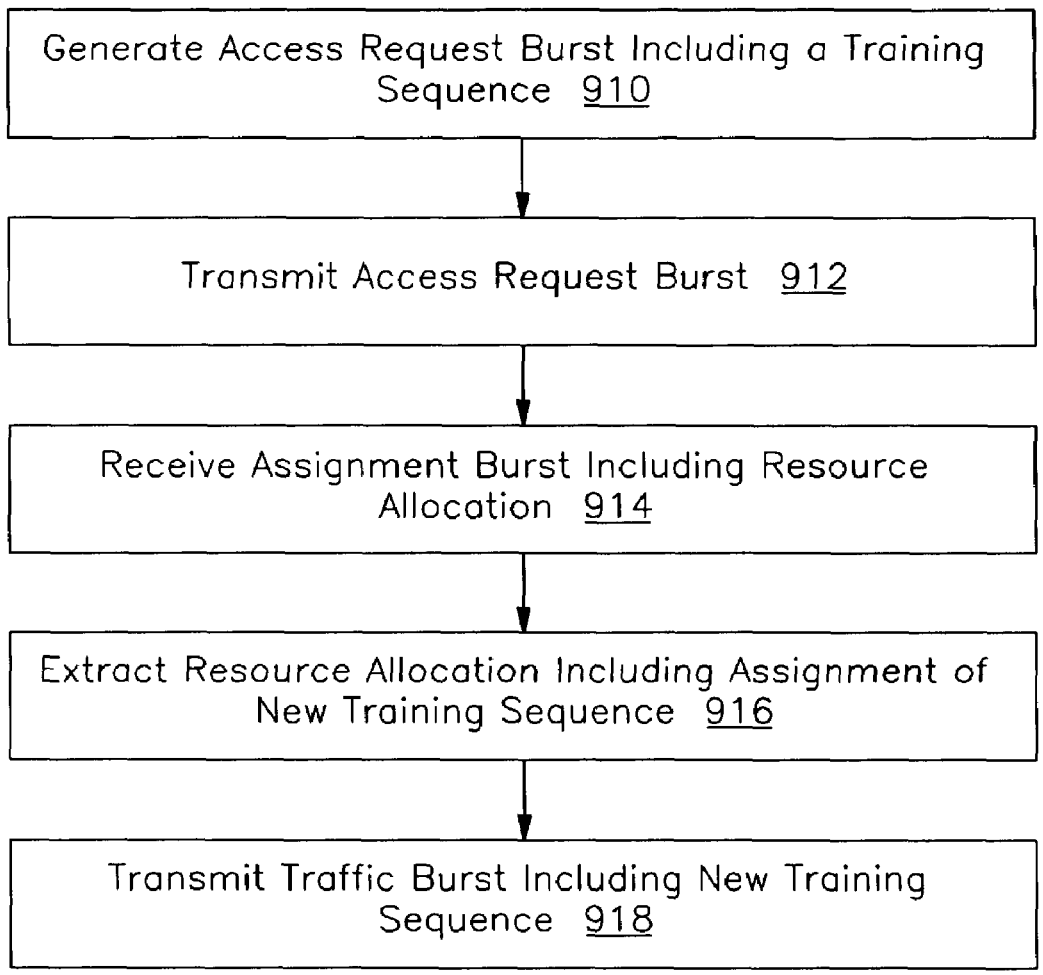
FIG. 9 is a flow chart of resource allocation for a logical connection according to an embodiment of the present invention.

FIG. 9 is a flow chart of spatial channel assignment at the user terminal according to one embodiment of the present invention. A registered user terminal (UT1) can have assigned spatial access control channels it can use to transmit access request bursts. To request access, UT1 selects an access control channel. The access control channel is a spatial channel, thus UT1's selection determines the conventional channel to transmit on and the training sequence to include in the communication. UT1 then generates 910 an access request burst, such as the RA burst described above. The training segment of the burst includes the assigned training sequence. In an embodiment, an access request burst includes a training sequence and also includes a request for a logical connection to a base station, such as a data stream. UT1 then transmits 912 this access request burst to the base station. The base station receives the burst, and if it decides to grant the requested logical connection, the base station will send back an assignment burst to provide resources for the logical connection.

UT1 receives 914 the assignment burst, such as the AA burst described above, and extracts 916 the included resource allocation data by decoding it. As discussed above, there are numerous possible formats for the resource assignment to instruct UT1 which conventional channel to use for the traffic bursts of the granted logical connection, and which training sequence to include in these bursts. UT1 then transmits 918 traffic bursts as part of the logical connection, such as a stream, and includes the assigned training sequence in the traffic bursts.

In one embodiment, the spatial channel assigned for this logical connection is a dedicated spatial channel. That is, other user terminals communicating on the same conventional channel as UT1 use different training sequences. Furthermore, it is possible that the conventional channel used by UT1 to send the access request burst is the same as the conventional channel assigned to the logical connection. The training sequences, i.e., the spatial channels would not be the same in this case.

Base Station Structure

Figure 10:
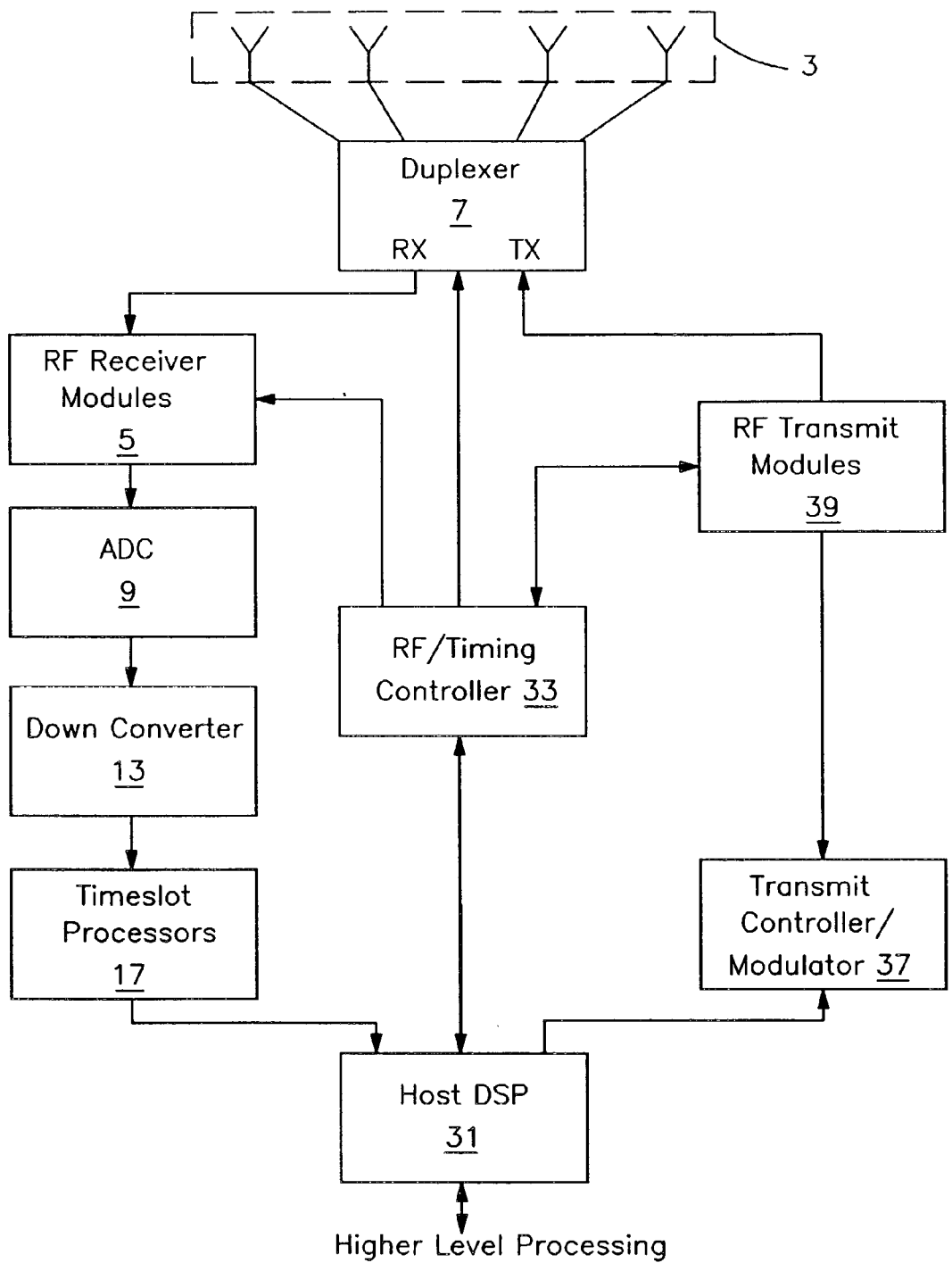
FIG. 10 is a simplified block diagram of a base station on which an embodiment of the invention can be implemented.

The present invention relates to wireless communication systems and may be a fixed-access or mobile-access wireless network using spatial division multiple access (SDMA) technology in combination with multiple access systems, such as time division multiple access (TDMA), frequency division multiple access (FDMA) and code division multiple access (CDMA). Multiple access can be combined with frequency division duplexing (FDD) or time division duplexing (TDD). FIG. 10 shows an example of a base station of a wireless communications system or network suitable for implementing the present invention. The system or network includes a number of subscriber stations, also referred to as remote terminals or user terminals, such as that shown in FIG. 11. The base station may be connected to a wide area network (WAN) through its host DSP 31 for providing any required data services and connections external to the immediate wireless system. To support spatial diversity, a plurality of antennas 3 is used to form an array 4, for example twelve antennas, although other numbers of antennas may be selected.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the present example, three down-converted outputs from each antenna's digital filter 13, one per receive timeslot. The particular number of timeslots can be varied to suit network needs. For example, GSM uses eight uplink and eight downlink timeslots for each TDMA frame. For each of the three receive timeslots, the twelve down-converted outputs from the twelve antennas are fed to a digital signal processor (DSP) 17 (hereinafter "timeslot processor") for further processing, including calibration, according to one aspect of this invention. Three Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal.

The output of the timeslot processors 17 is demodulated burst data for each of the three receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station. Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37.

The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7.

User Terminal Structure

Figure 11:
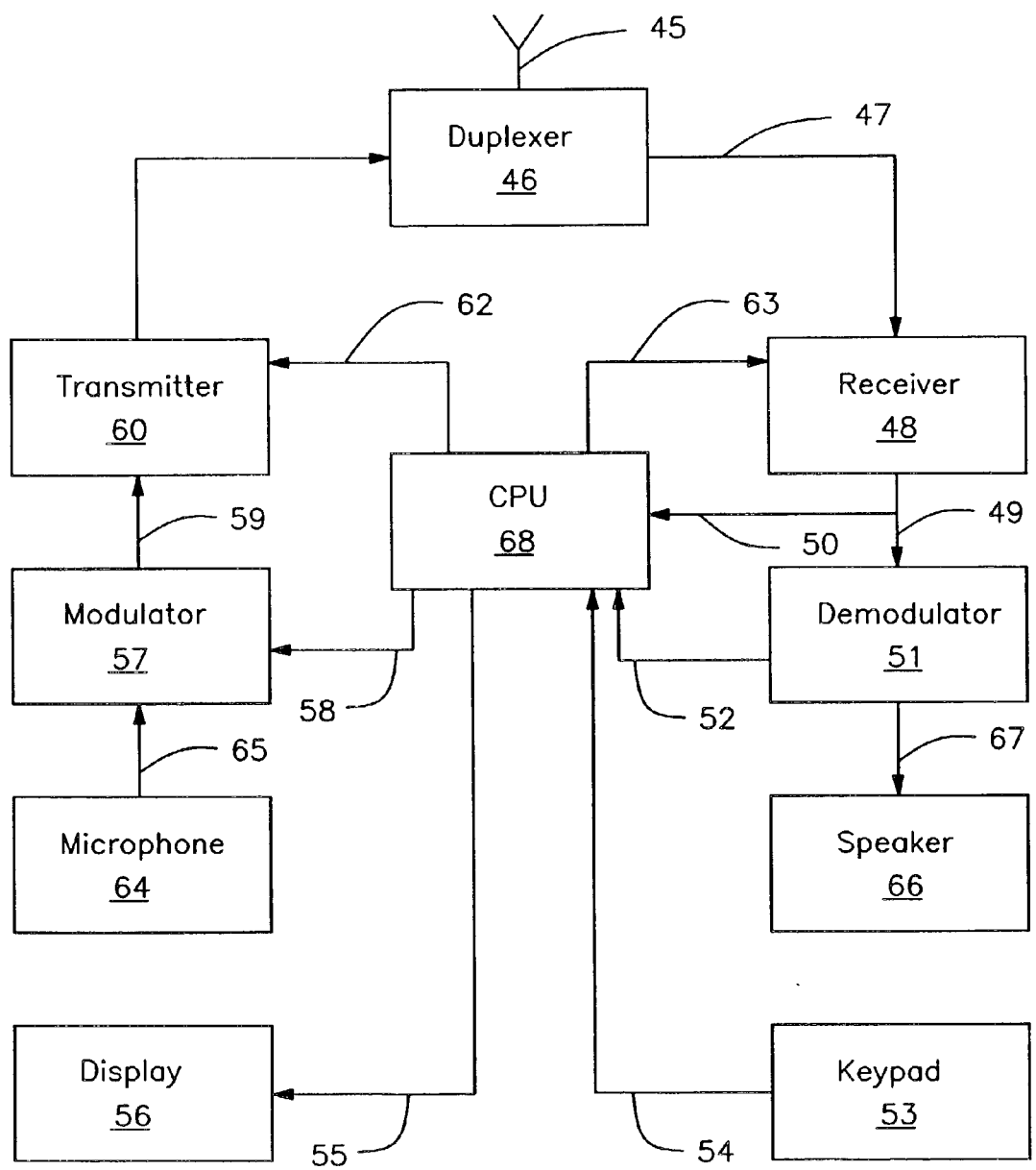
FIG. 11 is a simplified block diagram of a remote terminal on which an embodiment of the invention can be implemented.

FIG. 11 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 10 and 11, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using frequency hopping and spatial processing. These devices may be cellular phones, PDA's, laptop computers, or any other wireless devices. These devices may sometimes be generally referred to as radios or transceivers.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
    generating an access request burst including a first training sequence and a request for a logical connection to a base station;
    transmitting the access request burst to the base station on a conventional channel;
    receiving an assignment burst from the base station including a message granting the logical connection and a resource allocation for the logical connection;
    decoding the assignment message to extract the resource allocation, the resource allocation comprising an assigned conventional channel and a second training sequence; and
    transmitting a traffic burst belonging to the logical connection on the assigned conventional channel, the traffic burst including the second training sequence.

2. The method of claim 1, wherein the conventional channel and the assigned conventional channel each comprise a timeslot of a repeating frame on a radio frequency (RF) carrier.

3. The method of claim 1, wherein the conventional channel and the assigned conventional channel are the same conventional channel.

4. The method of claim 3, wherein the conventional channel in combination with the first training sequence comprises a first spatial channel occupying the conventional channel, and the conventional channel in combination with the second training sequence comprises a second spatial channel occupying the conventional channel.

5. The method of claim 4, wherein the first spatial channel comprises a random access logical channel (RACH) and the second spatial channel comprises a traffic logical channel (TCH).

6. The method of claim 1, wherein the access request burst includes the first training sequence in the same portion as the traffic burst includes the second training sequence.

7. A communications device comprising:
    a processor to generate an access request burst including a first training sequence and a request for a logical connection to a base station;
    a transmitter coupled to the processor to transmit the access request burst to the base station on a conventional channel;
    a receiver coupled to the processor to receive an assignment burst from the base station including a message granting the logical connection and a resource allocation for the logical connection;
    wherein the processor decodes the assignment message to extract the resource allocation, the resource allocation comprising an assigned conventional channel and a second training sequence; and
    the transmitter transmits a traffic burst belonging to the logical connection on the assigned conventional channel, the traffic burst including the second training sequence.

8. The communications device of claim 7, wherein the conventional channel and the assigned conventional channel each comprise a timeslot of a repeating frame on a radio frequency (RF) carrier.

9. The communications device of claim 7, wherein the conventional channel and the assigned conventional channel are the same conventional channel.

10. The communications device of claim 9, wherein the conventional channel in combination with the first training sequence comprises a first spatial channel occupying the conventional channel, and the conventional channel in combination with the second training sequence comprises a second spatial channel occupying the conventional channel.

11. The communications device of claim 10, wherein the first spatial channel comprises a random access logical channel (RACH) and the second spatial channel comprises a traffic logical channel (TCH).

12. The communications device of claim 7, wherein the processor generates the access request burst to include the first training sequence in the same portion as the traffic burst includes the second training sequence.

13. A computer-readable storage medium containing data representing instructions that, when executed by a processor, cause the processor to perform operations comprising:
   generating an access request burst including a first training sequence and a request for a logical connection to a base station;
   transmitting the access request burst to the base station on a conventional channel;
   receiving an assignment burst from the base station including a message granting the logical connection and a resource allocation for the logical connection;
   decoding the assignment message to extract the resource allocation, the resource allocation comprising an assigned conventional channel and a second training sequence; and
   transmitting a traffic burst belonging to the logical connection on the assigned conventional channel, the traffic burst including the second training sequence.

14. The computer-readable storage medium of claim 13, wherein the conventional channel and the assigned conventional channel each comprise a timeslot of a repeating frame on a radio frequency (RF) carrier.

15. The computer-readable storage medium of claim 13, wherein the conventional channel and the assigned conventional channel are the same conventional channel.

16. The computer-readable storage medium of claim 15, wherein the conventional channel in combination with the first training sequence comprises a first spatial channel occupying the conventional channel, and the conventional channel in combination with the second training sequence comprises a second spatial channel occupying the conventional channel.

17. The computer-readable storage medium of claim 16, wherein the first spatial channel comprises a random access logical channel (RACH) and the second spatial channel comprises a traffic logical channel (TCH).

18. The computer-readable storage medium of claim 13, wherein the access request burst includes the first training sequence in the same portion as the traffic burst includes the second training sequence.

19. A method comprising:
   receiving an access request burst including a first training signal from a first remote radio on a conventional channel, the access request burst being a request for a logical connection;
   receiving a traffic burst belonging to an existing logical connection from a second remote radio on the same conventional channel, the traffic burst including a second training signal.

20. The method of claim 19, wherein the first training signal and the second training signal are located in the same section of the access request burst and the traffic burst respectively.

21. The method of claim 20, wherein receiving the access request burst comprises:
   simultaneously receiving the access request burst and the traffic burst on the conventional channel as a composite signal;
   detecting the first training signal in the received composite signal; and
   extracting the access request burst from the composite signal using spatial processing and the first training signal.

22. The method of claim 19, wherein the conventional channel comprises a timeslot of a repeating frame on a radio frequency (RF) carrier.

23. The method of claim 19, further comprising receiving a second traffic burst belonging to a second existing logical connection from a third remote radio on the same conventional channel, the second traffic burst including a third training signal.

24. The method of claim 19, wherein the conventional channel in combination with the first training sequence comprises a first spatial channel occupying the conventional channel, and the conventional channel in combination with the second training sequence comprises a second spatial channel occupying the conventional channel.

25. The method of claim 24, wherein the first spatial channel comprises a random access logical channel (RACH) and the second spatial channel comprises a traffic logical channel (TCH).

26. A communications device comprising:
   a receiver to:
   receive an access request burst including a first training signal from a first remote radio on a conventional channel, the access request burst being a request for a logical connection; and
   receive a traffic burst belonging to an existing logical connection from a second remote radio on the same conventional channel, the traffic burst including a second training signal; and
   a processor coupled to the receiver to decode the received access request and traffic bursts.

27. The communications device of claim 26, wherein the first training signal and the second training signal are located in the same section of the received access request and traffic burst respectively.

28. The communications device of claim 27, wherein the receiver simultaneously receiving the access request burst and the traffic burst on the conventional channel as a composite signal; and
   the processor detects the first training signal in the received composite signal, and extracts the access request burst from the composite signal using spatial processing and the first training signal.

29. The communications device of claim 26, wherein the conventional channel comprises a timeslot of a repeating frame on a radio frequency (RF) carrier.

30. The communications device of claim 26, wherein the receiver further receives a second traffic burst belonging to a second existing logical connection from a third remote radio on the same conventional channel, the second traffic burst including a third training signal; and the processor further decodes the second traffic burst.

31. The communications device of claim 26, wherein the conventional channel in combination with the first training sequence comprises a first spatial channel occupying the conventional channel, and the conventional channel in combination with the second training sequence comprises a second spatial channel occupying the conventional channel.

32. The communications device of claim 31, wherein the first spatial channel comprises a random access logical channel (RACH) and the second spatial channel comprises a traffic logical channel (TCH).

33. A computer-readable medium containing data representing instructions that, when executed by a processor, cause the processor to perform operations comprising:

receiving an access request burst including a first training signal from a first remote radio on a conventional channel, the access request burst being a request for a logical connection;

receiving a traffic burst belonging to an existing logical connection from a second remote radio on the same conventional channel, the traffic burst including a second training signal.

34. The computer-readable medium of claim 33, wherein the first training signal and the second training signal are located in the same section of the access request burst and the traffic burst respectively.

35. The computer-readable medium of claim 34, wherein receiving the access request burst comprises:

simultaneously receiving the access request burst and the traffic burst on the conventional channel as a composite signal;

detecting the first training signal in the received composite signal; and extracting the access request burst from the composite signal using spatial processing and the first training signal.

36. The computer-readable medium of claim 33, wherein the processor further performs operations comprising receiving a second traffic burst belonging to a second existing logical connection from a third remote radio on the same conventional channel, the second traffic burst including a third training signal.

* * * * *

UNITED STATES PATENT AND TRADEMARK OFFICE
CERTIFICATE OF CORRECTION

PATENT NO. : 7,492,743 B2
APPLICATION NO. : 10/262409
DATED : February 17, 2009
INVENTOR(S) : Uhlik et al.

It is certified that error appears in the above-identified patent and that said Letters Patent is hereby corrected as shown below:

In column 19, at line 3 delete, "fUrther" and insert --further--.

Signed and Sealed this

Fifth Day of October, 2010

David J. Kappos
*Director of the United States Patent and Trademark Office*